UNITED STATES PATENT OFFICE.

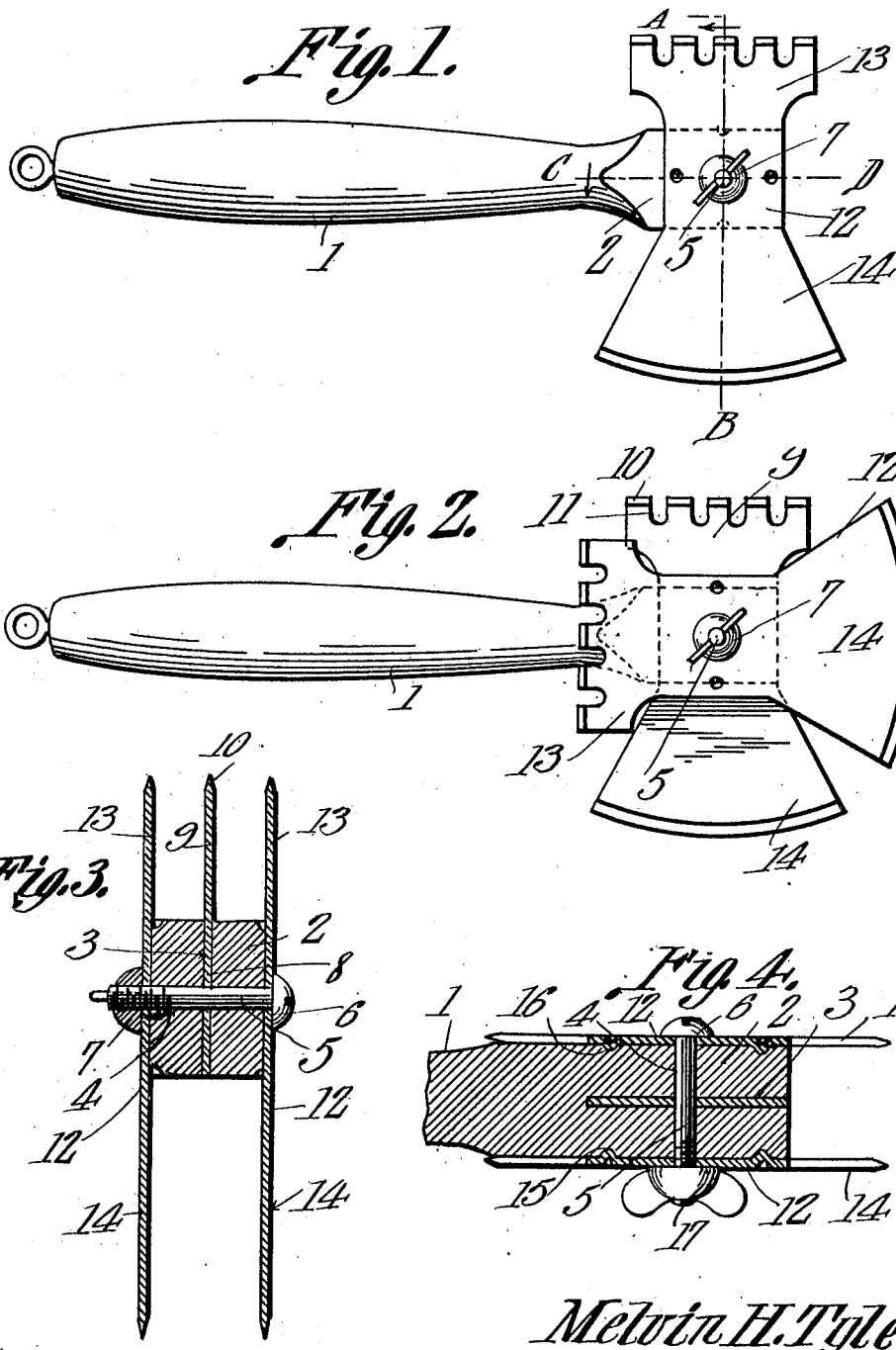

MELVIN H. TYLER, OF MUNCIE, INDIANA.

COMPOUND TOOL.

988,605.  Specification of Letters Patent. Patented Apr. 4, 1911.

Application filed April 16, 1910. Serial No. 555,818.

*To all whom it may concern:*

Be it known that I, MELVIN H. TYLER, a citizen of the United States, residing at Muncie, in the county of Delaware and State of Indiana, have invented a new and useful Compound Tool, of which the following is a specification.

This invention relates to compound tools and is more particularly designed for kitchen use.

One of the objects of the invention is to provide a simple, durable and compact tool which can be used for chopping meats, vegetables, etc., and which can be readily adjusted for use as an ice pick, pan scraper, and the like.

A further object is to provide a tool of this character which can be readily manipulated and can be readily adjusted to desired positions.

With these and other objects in view the invention consists of certain novel details of construction and combinations of parts hereinafter more fully described and pointed out in the claims.

In the accompanying drawings the preferred form of the invention has been shown.

In said drawings:—Figure 1 is a side elevation of the tool and showing the parts arranged for chopping meat, vegetables, etc. Fig. 2 is a view similar to Fig. 1 and showing one of the blades adjusted for use either as an ice pick or as a pan scraper. Fig. 3 is a section on line A—B Fig. 1. Fig. 4 is a section on line C—D Fig. 1.

Referring to the figures by characters of reference, 1 designates a handle having a head 2 which is preferably rectangular in cross section and has a central longitudinal slot 3. A central opening 4 extends transversely through the head and is adapted to receive a clamping bolt 5 having a head 6 at one end while the wing nut 7 is mounted upon the other end thereof. A plate 8 is located within the slot 3 and has a blade 9 extending therefrom, said blade having a sharpened straight edge 10 into which extend notches 11 located at regular intervals, thus forming teeth, as shown in Fig. 2.
Plates 12 are pivotally mounted on the end portions of the bolt 5 and each of these plates has oppositely extending blades 13 and 14 formed integral therewith, each of the blades 13 being of the same size and proportion as the blade 9 heretofore referred to while each of the blades 14 is in the form of a sharpened segment, as shown in Figs. 1 and 2.

A desired number of projections 15 are struck inwardly from each of the plates 12 and these projections are adapted to register with and to project into notches 16 formed in the sides of the head 2. When the projections are seated within these notches the plates 12 will be held with their blades 13 alining with the blade 9 and the blade 14 disposed one beside the other. By tightening the bolt 5 by means of the wing nut 7, the various blades can be firmly clamped upon the head 2 and the walls of the slot 3 in said head tightly clamped upon the blade 8.

When it is desired to utilize the tool for chopping meat, the blades are arranged as shown in Fig. 1 and the sharpened segmental blades 14 are then used as the cutting elements, the tool being handled in the same manner as a hatchet. Should it be desired to use the device as a meat tenderer the blades are maintained in the same position but the notched edges 10 of the blades 9 and 13 are employed instead of the segmental blades 14. For use as an ice pick, the tool is arranged with its blades out of alinement as shown in Fig. 2. In order to thus arrange the blades the bolt 5 is loosened sufficiently to permit the projections 15 on one of the plates 12 to be removed from the adjoining recesses 16. The plate 12 is then turned about the bolt 5 as a pivot until brought into position at right angles to its former position and the bolt is then tightened. The shifted blade 14 can then be used as a pan scraper while, if desired, the other blade 14 can be used as an ice pick. The shifted blade 14 can also be used for shaving ice. Obviously various other uses can be devised for the various blades.

Changes can of course be made in the construction and arrangement of the parts without departing from the spirit or sacrificing any of the advantages of the invention as defined in the appended claims.

What is claimed is:—

1. A compound tool including a head having a slot, an intermediate plate immovably mounted within the slot and having a blade extending beyond one face of the head, said head having recessed faces, side plates bearing upon the recessed faces of the head, oppositely extending blades upon each of said side plates, one of the blades on each plate being similar to and parallel with the intermediate blade, a pivot device extending transversely through all of the plates and through the head and constituting means for attaching the plates to the head, and means engaging the pivot device for clamping the plates upon the head to engage the recessed portions thereof.

2. A compound tool including a slotted head, a combined pivot and clamping device extending transversely through the head and across the slot, a non-adjustable plate retained in the slot by the pivot device and held against rotation by the walls of the slot, said plate having a blade extending beyond the head, side plates mounted for rotation upon the end portions of the pivot device and outside of the head, each of said side plates having oppositely extending blades, one of the blades being similar to the blade upon the intermediate plate, and means for holding the side plates against rotation upon the pivot device.

In testimony that I claim the foregoing as my own, I have hereto affixed my signature in the presence of two witnesses.

MELVIN H. TYLER.

Witnesses:
 ALTA SUMMERS,
 A. E. VINTON.